United States Patent
Amin

(10) Patent No.: US 7,976,613 B2
(45) Date of Patent: Jul. 12, 2011

(54) DEHYDRATION OF NATURAL GAS IN AN UNDERWATER ENVIRONMENT

(75) Inventor: Robert Amin, Salter Point (AU)

(73) Assignee: Woodside Energy Limited, Perth, WA (AU)

( * ) Notice: Subject to any disclaimer, the term of this patent is extended or adjusted under 35 U.S.C. 154(b) by 1248 days.

(21) Appl. No.: 11/485,389

(22) Filed: Jul. 13, 2006

(65) Prior Publication Data
US 2006/0260468 A1 Nov. 23, 2006

(30) Foreign Application Priority Data
Aug. 16, 2005 (AU) .................... 2005904414

(51) Int. Cl.
*B01D 53/14* (2006.01)
(52) U.S. Cl. .......... 95/153; 585/15; 166/357; 95/228; 95/231; 62/45.1; 62/53.1
(58) Field of Classification Search .......... 95/153; 585/15; 166/52, 266, 267, 272.6; 210/170, 210/747
See application file for complete search history.

(56) References Cited

U.S. PATENT DOCUMENTS

| | | | |
|---|---|---|---|
| 2,818,454 A * | 12/1957 | Wilson | 585/15 |
| 3,384,169 A * | 5/1968 | Leonard | 166/357 |
| 4,424,858 A * | 1/1984 | Elliott et al. | 166/52 |
| 5,044,440 A * | 9/1991 | Stinessen et al. | 166/344 |
| 5,398,762 A * | 3/1995 | Stinessen | 166/356 |
| 5,536,893 A * | 7/1996 | Gudmundsson | 585/15 |
| 5,720,337 A * | 2/1998 | Voss et al. | 165/10 |
| 6,502,635 B1 * | 1/2003 | Underdown et al. | 166/267 |
| 6,735,979 B2 * | 5/2004 | Lecomte et al. | 62/611 |
| 6,973,948 B2 * | 12/2005 | Pollack et al. | 141/387 |
| 7,093,655 B2 * | 8/2006 | Atkinson | 166/266 |
| 7,591,148 B2 * | 9/2009 | Sanada | 62/507 |

FOREIGN PATENT DOCUMENTS

| | | |
|---|---|---|
| WO | 0174473 A1 | 11/2001 |
| WO | WO 01/74473 A1 * | 11/2001 |
| WO | 03062725 A1 | 7/2003 |
| WO | WO 03/062725 A1 * | 7/2003 |
| WO | 2004070297 A1 | 8/2004 |
| WO | WO 2004/070297 A1 * | 8/2004 |

* cited by examiner

*Primary Examiner* — Duane Smith
*Assistant Examiner* — Ives Wu
(74) *Attorney, Agent, or Firm* — Edell, Shapiro & Finnan, LLC

(57) ABSTRACT

A process for removing water from a natural gas in an underwater environment is described. The process comprises dehydrating a natural gas feed stream in an apparatus arranged to exchange heat with the underwater environment, preferably including the step of forming hydrates in a hydrate forming zone of a hydrate vessel. The step of forming hydrates in the hydrate zone may comprise the step of introducing the natural gas feed stream into the hydrate vessel through an expansion device with the expansion device is located at and defines a gas inlet to the hydrate vessel. Heat exchange with the hydrate vessel itself need not occur as in one embodiment, heat exchange with the underwater environment takes place through an arrangement of pipes upstream of the hydrate vessel.

12 Claims, 8 Drawing Sheets

DEHYDRATION OF NATURAL GAS IN AN UNDERWATER ENVIRONMENT

CROSS REFERENCE TO RELATED APPLICATIONS

This application is claims priority from Australian Application No. AU 2005904414, filed on Aug. 16, 2005, entitled, "Dehydration of a Natural Gas in an Underwater Environment", the entire contents of which are hereby incorporated by reference.

FIELD OF THE INVENTION

The present invention relates to a process and apparatus for dehydrating a natural gas feed stream in an underwater environment. The present invention relates particularly, though not exclusively, to a process and apparatus for dehydrating a natural gas feed stream in a sub-sea environment.

BACKGROUND TO THE INVENTION

Methods for producing hydrocarbons from sub-sea wells are known. Typically, hydrocarbons are produced from one or more sub-sea wellheads positioned at a sea-bed location that is some distance away from the location of an offshore drilling and production platform. The hydrocarbons produced at the sub-sea wellhead(s) are delivered to the offshore drilling and production platform through one or more pipelines. Alternatively, the hydrocarbons produced from sub-sea wells may be routed from a sub-sea wellhead directly to land through a pipeline, as long as the wellhead is located sufficiently close to the shore. Hydrocarbons may also be produced from a sub-sea well and then transferred through a pipeline to a moored floating production, storage, and off-loading tanker, commonly referred to in the art as an FPSO tanker.

Natural gas from either production reservoirs or storage reservoirs typically contains water, as well as other contaminant species, which form solids during the liquefaction to produce liquefied natural gas (LNG). It is common practice for the natural gas to be subjected to a dehydration process prior to transfer or liquefaction. Dehydration of natural gas produced from sub-sea wells is conducted to reduce the risk of corrosion and free-water accumulation in the low points of a pipeline.

Methods of dehydrating natural gas feed streams known in the art include absorption of water in glycol (ethylene, diethylene, triethylene and tetraethylene), using solid desiccants such as silica gel, silica-alumina gels, calcium chloride [$CaCl_2$], or hydrated aluminium oxide, or using molecular sieves. Molecular sieves are used when very low water dew points are required. Another process used to simultaneously remove water and heavy hydrocarbons for dew point control is dry bed adsorption, a process by which a gas stream is passed through adsorbing dry beds of, typically, silica gel.

Traditional dehydration processes described above were all developed to specifically prevent gas hydrate formation from occurring in pipelines and heat-exchangers upstream of a liquefaction vessel. Hydrates are stable crystalline solids having the outward appearance of ice with gas molecules trapped in an ice-like cage structure. The general term for this type of solid is clathrate. Most gases can form hydrates. It is known that C1 to C4 hydrocarbons as well as hydrogen sulphide ($H_2S$) and carbon dioxide ($CO_2$) readily form hydrates at low temperature and high pressure. When the temperature is raised above the so-called "hydrate dissolution temperature" the hydrates dissolve or meet, liberating the trapped gas and producing a water-containing liquid.

The formation of gas hydrates is thermodynamically suppressed by adding antifreeze materials such as salts or glycols and/or inhibiting nucleation and growth of hydrates by using particular polymers or surfactants. Moreover these existing dehydration processes are costly and complex and ill-adapted to use at the sea-bed.

The present invention was developed to provide a process and apparatus for dehydrating natural gas in a sub-sea environment.

SUMMARY OF THE INVENTION

According to one aspect of the present invention, there is provided a process for removing water from a natural gas in an underwater environment which process comprises dehydrating a natural gas feed stream in an apparatus arranged to exchange heat with the underwater environment. In one embodiment the step of dehydrating the natural gas feed stream includes the step of forming hydrates in a hydrate forming zone of a hydrate vessel. The step of forming hydrates in the hydrate zone may comprise the step of introducing the natural gas feed stream into the hydrate vessel through an expansion device with the expansion device is located at and defines a gas inlet to the hydrate vessel.

When the temperature of the underwater environment is less than the hydrate formation temperature for a given operating pressure of the hydrate vessel and the step of forming hydrates may be achieved in part through heat exchange of the natural gas feed stream with the underwater environment. If sufficient heat exchange is arranged to occur upstream of the hydrate vessel, an expansion device may not be needed. The heat exchange with the underwater environment may be achieved in part through heat exchange of the natural gas feed stream with the underwater environment in the hydrate formation zone of the hydrate vessel.

Heat exchange with the hydrate vessel itself need not occur as in one embodiment, heat exchange with the underwater environment takes place through an arrangement of pipes upstream of the hydrate vessel.

The process may further comprise the step of pre-cooling the natural gas feed stream to a temperature that is intermediate between wellhead temperature and hydrate forming temperature through heat exchange with the underwater environment prior to the step of dehydrating the natural gas feed stream.

In order to release dry gas and a water-containing liquid from the hydrates, the process further comprises the step of dissolving at least a portion of the hydrates in a hydrate dissolution zone of the hydrate vessel to form dry gas and a water-containing liquid, and removing from the hydrate vessel a dry gas outlet stream and a water-containing liquid stream. The hydrates could equally be removed from the hydrate vessel as a slurry and dissolved externally of the hydrate vessel to produce dry gas. Advantageously, the step of dissolving at least a portion of the hydrates may comprise the step of adding to the hydrates a warm liquid having a temperature above the hydrate dissolution temperature for a given operating pressure of the hydrate vessel. The warm liquid may be one or more of the natural gas liquids, water and/or sea-water.

In one embodiment, the step of adding a warm liquid to the hydrate vessel comprises the step of spraying or atomizing the warm liquid into the hydrate dissolution zone of the hydrate vessel to improve heat transfer kinetics.

The warm liquid and water may be separated from the water-containing liquid removed from the hydrate vessel, with the warm liquid being optionally re-heated and recycled to the step of dissolving the hydrates in the hydrate dissolution zone of the hydrate vessel. Advantageously, the warm liquid may be reheated through heat exchange with the natural gas feed stream from the wellhead as a pre-cooling stage for the natural gas feed stream.

The process may further comprise the step of passing the natural gas feed stream through a gas/liquid separator upstream prior to the step of dehydrating the natural gas fee stream to remove free water and natural gas liquids from the natural gas feed stream. The natural gas liquids so removed may be used to dissolve the hydrates.

When the temperature of the underwater environment is greater than the hydrate dissolution temperature for a given operating pressure of the hydrate vessel, the process may includes the step of dissolving the hydrates at least in part through heat exchange of the hydrates with the underwater environment. The step of dissolving the hydrates may be achieved at least in part through heat exchange of the hydrates with the underwater environment in the hydrate dissolution zone of the hydrate vessel or through heat exchange external to the hydrate vessel.

According to a second aspect of the present invention there is provided an apparatus for removing water from natural gas in an underwater environment, the apparatus arranged to dehydrate a natural gas feed stream using heat exchange with the underwater environment.

In one embodiment, the apparatus comprises a hydrate vessel for dehydrating the natural gas feed stream, the hydrate vessel comprising a gas outlet at an uppermost portion of the hydrate vessel for removing dry gas, a liquid outlet at a lowermost portion of the vessel for removing a water-containing liquid stream, and a gas inlet for introducing the natural gas feed stream to the hydrate vessel, the gas inlet positioned at a height intermediate between the dry gas outlet and the liquid outlet.

When the hydrates are both formed and dissolved within the hydrate vessel, the hydrate vessel includes a hydrate formation zone within which hydrates are formed and a hydrate dissolution zone within which hydrates are dissolved to form dry gas and a water-containing liquid.

The apparatus may further comprises a phase separator for receiving the water-containing liquid and separating water therefrom. The phase separator may be located at and/or defines the byproduct outlet of the vessel.

Heat exchange with the underwater environment need not occur through heat exchange with the hydrate vessel. Alternatively or additionally, the apparatus may further comprise one or more pre-cooling stages upstream from the hydrate vessel for pre-cooling the natural gas feed stream to a temperature that is intermediate between wellhead temperature and hydrate forming temperature, the pre-cooling stages being arranged to exchange heat with the underwater environment The apparatus may further comprise an expansion device upstream of the hydrate vessel for cooling the natural gas feed stream and in one embodiment the expansion device is located at and defines a gas inlet to the hydrate vessel.

The hydrate vessel may further comprises a warm liquid inlet for adding to the hydrates a warm liquid having a temperature above the hydrate dissolution temperature for a given operating pressure of the hydrate vessel, the warm liquid inlet being arranged at a height intermediate between the gas inlet and the liquid outlet. The warm liquid inlet may be tangential to the hydrate vessel and/or further comprise means for spraying or atomizing the warm liquid into the hydrate vessel to improve heat transfer kinetics. Similarly, the gas inlet of the hydrate vessel may be adapted to cause spraying or atomization of the natural gas fed stream.

The apparatus may further comprise one or more heat-exchangers for re-heating the warm liquid through heat exchange with the natural gas feed stream from the wellhead as one of the pre-cooling stages. A gas/liquid separator upstream of the hydrate vessel may be provided for removing free water and/or natural gas liquids from the natural gas feed stream.

The apparatus may further comprise a heater for dissolving any undissolved hydrates removed from the hydrate vessel with the water-containing liquid stream.

When the temperature of the underwater environment is less than the hydrate formation temperature for a given operating pressure of the hydrate vessel, the hydrate vessel may be arranged to encourage heat exchange with the underwater environment in the hydrate formation zone and discourage heat exchange with the underwater environment in the hydrate dissolution zone. When the temperature of the underwater environment is greater than the hydrate dissolution temperature for a given operating pressure of the hydrate vessel, the hydrate vessel may be arranged to encourage heat exchange with the underwater environment in the hydrate dissolution zone and discourage heat exchange with the underwater environment in the hydrate formation zone. In either case, heat exchange with the underwater environment may be encouraged by circulating seawater through a heat exchanger arranged within the hydrate vessel and/or by increasing the effective surface area of at least a portion of the hydrate vessel, for example using a plurality of fins arranged external to the at least a portion of the hydrate vessel. Heat exchange with the underwater environment may be discouraged using one or more layers of insulation.

According to a third aspect of the present invention there is provided an underwater pipeline for delivery of a gas from a sub-sea well or sub-sea manifold to land, at least a portion of the gas being dehydrated using the process of the first aspect of the present invention or the apparatus of the second aspect of the present invention. The material specifications of the pipeline are less onerous than those required to transport an untreated natural gas stream from a sub-sea wellhead to land. This is because water and carbon dioxide in natural gas combine to form carbonic acid which causes corrosion of mild steel with the result that existing pipelines rely on the use of more exotic materials to resist this corrosive attack. The process of the present invention need not result in dehydration of all of the gas being delivered to the pipeline. The process may be used to dehydrate a bypass stream of natural gas with the dry gas produced being added back to the remainder of the natural gas which has not been treated. The result is still a reduction in the amount of water available to cause corrosion of the pipeline with the concomitant saving in material cost of construction of said pipeline.

DESCRIPTION OF THE FIGURES

Embodiments of the present invention will now be described, by way of example only, with reference to the accompanying drawings, in which.

DESCRIPTION OF THE PREFERRED EMBODIMENTS

Figure 1:
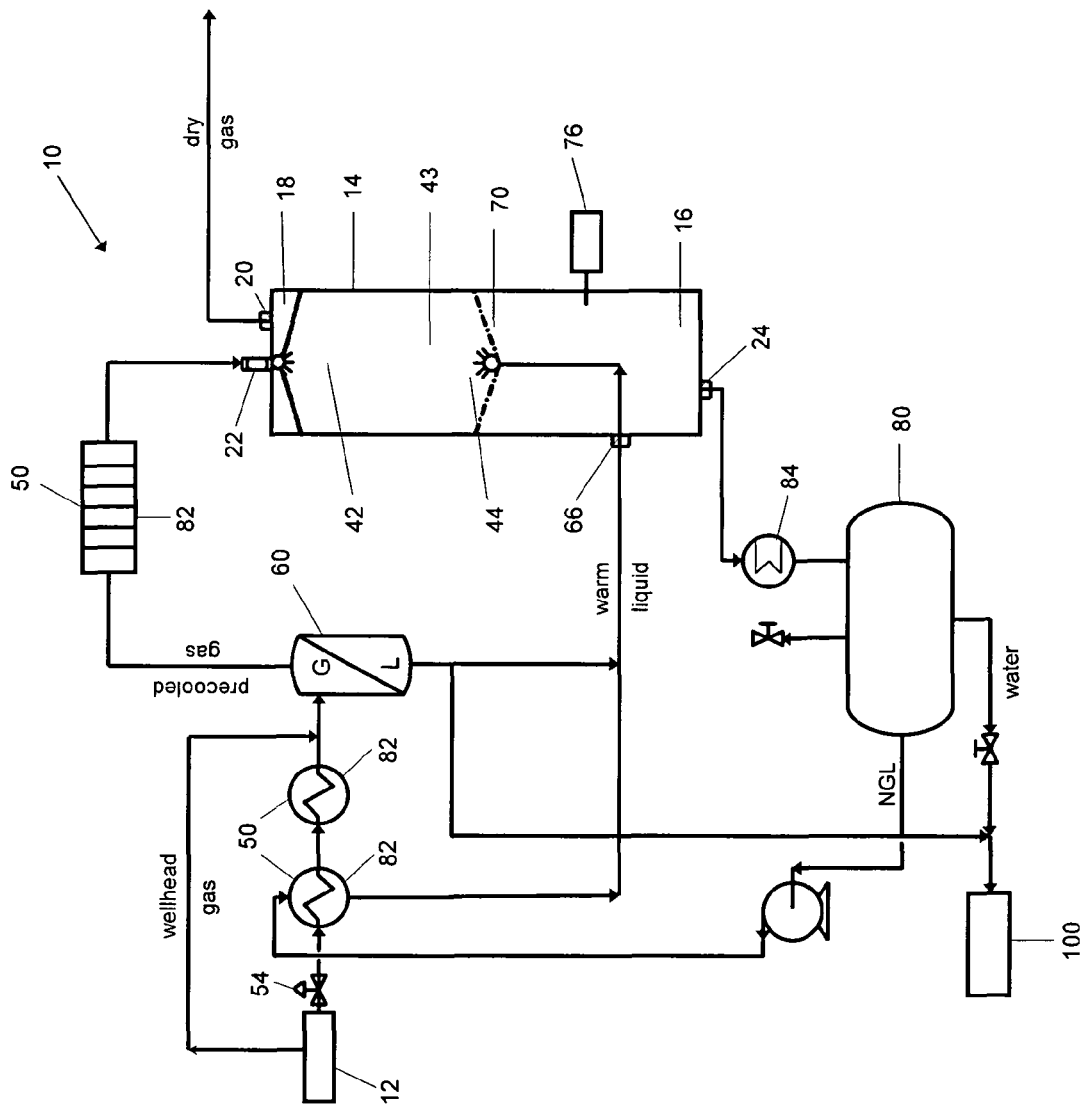
FIG. 1 illustrates a process flow diagram of a first embodiment of the present invention.

Before various embodiments of the underwater dehydration process and apparatus are described, it is to be understood that the various aspects of the present invention are not limited to the particular sequence of steps, operating pressures and temperatures, nor the particular arrangement or number of the vessels described. The terminology used herein is for the purpose of describing particular embodiments only, and is not intended to limit the scope of the present invention in any way. Unless defined otherwise, all technical and scientific terms used herein have the same meanings as commonly understood by one of ordinary skill in the art to which this invention belongs.

Although other types of processes and apparatus similar to or equivalent to those described herein can be used to practice or test the various aspects of the present invention, illustrative examples of the apparatus and method are now described with reference to the underwater dehydration of a natural gas feed stream in a sub-sea environment. Other gases that are known to form hydrates could equally be dehydrated using the process and apparatus of the present invention.

Throughout this specification various terms commonly used in the hydrocarbon industry are used. In the interests of clarity, such terms are now defined.

The term "underwater" is used throughout this specification to refer to apparatus positioned below the water-line, including apparatus that is positioned sub-sea or under the surface of another body of water or salt-water such as a lake or dam. The apparatus need not be fully submerged underwater, provided only that heat exchange takes place underwater.

The term "sub-sea" is used throughout this specification to refer to apparatus positioned at the seabed and/or processes conducted at the seabed. The seabed may be located in coastal areas where the hydrocarbons produced from the sub-sea well are delivered via pipeline to land as well as off-shore locations where the hydrocarbons produced from a sub-sea well are delivered to an offshore platform or FPSO. The term "sub-sea" also includes "deep-water" locations where water depths may exceed the approximate water depth at the edge of the continental shelf (200-300 m). The opposite to "sub-sea" is topside" which is a term that is used to refer to operations that are conducted above the water-line, for example on an off-shore platform or ocean-going vessel or on land.

The term "heat exchange" includes the flow of heat from any a hot body to a cold body in accordance with the laws of thermodynamics. Thus if, for example, the sub-sea temperature is lower than the temperature of a stream of wellhead gas flowing through a pipe, the heat exchange that occurs will result in the cooling of the stream of wellhead gas. If, on the other hand, the sub-sea temperature is higher than, for example, the hydrate dissolution temperature, the heat exchange that occurs will be the heating of the hydrates so as to cause them to dissolve.

The term "natural gas liquids" is used to refer to the components of natural gas that are present in liquid form during gas processing. The natural gas liquids include propane, butane, pentane, hexane and heptane, but not methane and ethane, since these hydrocarbons need refrigeration to be liquefied. The term "natural gas liquids" is commonly abbreviated as NGL.

The term "warm liquid" is used to refer to any compatible stream of liquid having a temperature above the hydrate dissolution temperature for a given pressure of operation of the hydrate vessel. The warm liquid stream thus has a temperature that is sufficiently high to cause melting of the hydrates. The warm liquid may or may not take the water released from the hydrates fully into solution.

The term "dehydrate" refers to the removal of water from a substance. The substance may be crude oil, natural gas or NGL. The term "dehydrated" or "dry" gas does not however mean that the gas is totally devoid of water but rather that the water vapor content of the gas is below maximum allowable water vapor contents to meet delivery requirements.

The term "free water" is used to refer to water that is mobile in a hydrocarbon reservoir which may flow out of a well with wellhead gas during production. Free water separates easily from oil or gas under gravity separation.

The present invention is partly based on the realization that an underwater environment, particularly a sub-sea environment, is unique in that it provides a relatively constant and predictable temperature (subject to seasonal variations) compared with topside conditions which can vary widely in temperature over a 24 hour period. Whilst topside ambient temperature may be 20-25° C., the temperature in a sub-sea environment is more likely to be in the order of 2-10° C. depending on water depth. The temperature of sub-sea wellhead gas is typically in the range of 25-40° C. Thus the present invention is also partly based on the realization that an underwater environment, particularly a sub-sea environment, is a naturally occurring and freely renewable source of heat exchange that can be utilized to assist in cooling the natural gas during dehydration.

The process and apparatus of the present invention has been designed to take advantage of this source of cooling and to meet the technical challenges associated with positioning dehydration apparatus at the sea-bed. The process and apparatus of the present invention has been designed to rely on a minimum number of mechanical or moving parts and minimum power compared with topside processing systems and apparatus. This is done to provide a more compact size and also to keep maintenance requirements to a minimum as is desirable for sub-sea equipment.

A first embodiment of a process and apparatus 10 for removing water from natural gas in an underwater environment is illustrated in FIG. 1. In this embodiment the underwater apparatus 10 is positioned at the sea-bed in proximity to one or more sub-sea wellhead(s) 12. It is to be appreciated that a plurality of sub-sea wells may feed natural gas to a common manifold for distribution to the apparatus of the present invention. The underwater apparatus 10 includes one or more hydrate vessel(s) 14 arranged in series or parallel in which the natural gas is dehydrated to produce a dry gas outlet stream. The hydrate vessel(s) 14 may be arranged to provide 100% capacity whilst one or more of the hydrate vessels 14 is off-line to ensure continuous operation of the process.

Dehydration of the natural gas feed stream is achieved by cooling the natural gas feed stream sufficiently to cause hydrates to form in the hydrate vessel 14. Once formed, the hydrates migrate under gravity towards a lowermost end 16 of the hydrate vessel 14. Each hydrate is comprised of a crystal lattice of water with gas trapped within the lattice. Heating of the hydrates to a temperature above the hydrate dissolution temperature liberates the gas that rises as a dry gas towards an uppermost end 18 of the hydrate vessel 14 and produces a water-containing liquid that migrates under gravity towards the lowermost end 16 of the hydrate vessel 14. Heating of the hydrates may be achieved by applying heat directly or indirectly to the hydrate vessel 14. It is not necessary that all of the hydrates that form in the hydrate vessel 14 be dissolved within the hydrate vessel 14. It is equally possible for a portion of the hydrates to be removed from the hydrate vessel 14 in the form of a slurry with the water-containing liquid.

Hydrates may be formed in the hydrate vessel 14 by cooling the natural gas feed stream as it is introduced to the hydrate vessel 14 or by directly or indirectly cooling at least a portion of hydrate vessel 14 through heat exchange with the sub-sea environment. The particular temperature and pressure conditions that are conducive to forming hydrates in the hydrate vessel 14 depend on a number of relevant factors including the particular composition of the natural gas feed stream. It is considered to be a matter of routine for the person skilled in the art to generate an equilibrium pressure-temperature phase diagram for a given composition of the natural gas feed stream to establish the conditions under which hydrates will form in the vessel. In this regard, hydrate formation is favored under conditions of elevated pressure and low temperature. It is preferable to form hydrates by lowering the temperature rather than by lowering the pressure as any loss in pressure makes it more difficult to deliver the dry outlet gas to an end-user.

The natural gas feed stream may include sour gas species, such as hydrogen sulphide or carbon dioxide. The operating temperature of the hydrate vessel 14 should be maintained below the temperature at which hydrates are formed but above the temperature at which solids of the sour gas species form. It is understood that any hydrogen sulphide present in the natural gas feed stream will promote hydrate formation and thus solids of hydrogen sulphide may form within the hydrate vessel 14. When the hydrates are dissolved after formation, any solids of hydrogen sulphide that have formed will also dissolve.

Cooling of the natural gas feed stream to form hydrates also cools the gas through the dew points of various heavy hydrocarbons. As a result, the natural gas is not only dehydrated but is also dew-pointed for both water and hydrocarbons to an extent determined by the operating conditions of pressure and temperature in the hydrate vessel 14. Using the process of the present invention, the water content of the dry outlet gas stream is reduced to less than 5 ppm with a water dew point of around −70° C. The dry gas outlet stream is suitable for delivery through a pipeline to land, an FPSO, a platform or any other location and may be subjected to additional downstream processing if desired. The dry gas outlet stream may be subjected to downstream processing to produce by-product streams of LPG and/or LNG if desired. The dry gas outlet stream may equally be subjected to any suitable conventional gas sweetening process to meet delivery requirements in relation to acceptable levels of the sour gas species.

As is apparent from the description above, hydrates are caused to form in a hydrate formation zone 42 in the hydrate vessel 14 and are caused to dissolve in a hydrate dissolution zone 44 in the hydrate vessel 14. The hydrate vessel 14 may further contain a third zone 43 intermediate between the hydrate formation zone 42 and the hydrate dissolution zone 44. Within the third zone 43, the hydrates neither form nor dissolve but simply migrate under gravity towards the lowermost end 16 of the hydrate vessel 14.

The temperature in the hydrate formation zone 42 of the hydrate vessel 14 is lower than the hydrate formation temperature for the given operating pressure of the hydrate vessel 14. The temperature in the hydrate dissolution zone 44 of the hydrate vessel 14 is above the hydrate dissolution temperature for the given operating pressure of the hydrate vessel 14. It is preferable to keep the size of the hydrate dissolution zone 44 to a minimum in order to maximize the size of the water droplets that form during dissolution (and thus minimize the risk of carry over of water) and to minimize the transfer of heat between the hydrate formation zone 42 and the hydrate dissolution zone 44.

The hydrate vessel 14 is provided with a dry gas outlet 20 for removing the dry gas outlet stream, a gas inlet 22 for introducing the natural gas feed stream to the hydrate vessel 14, and a liquid outlet 24 for removing the water-containing liquid from the hydrate vessel 14. The dry gas outlet 20 is positioned towards the uppermost end 18 of the hydrate vessel 14. The liquid outlet 24 is positioned towards the lowermost end 16 of the hydrate vessel 14. The gas inlet 22 is positioned at a height intermediate between the dry gas outlet 20 and the liquid outlet 24. The height of the gas inlet 22 may be adjusted to minimize carry over of the hydrate into the dry gas outlet 20.

Figure 5:
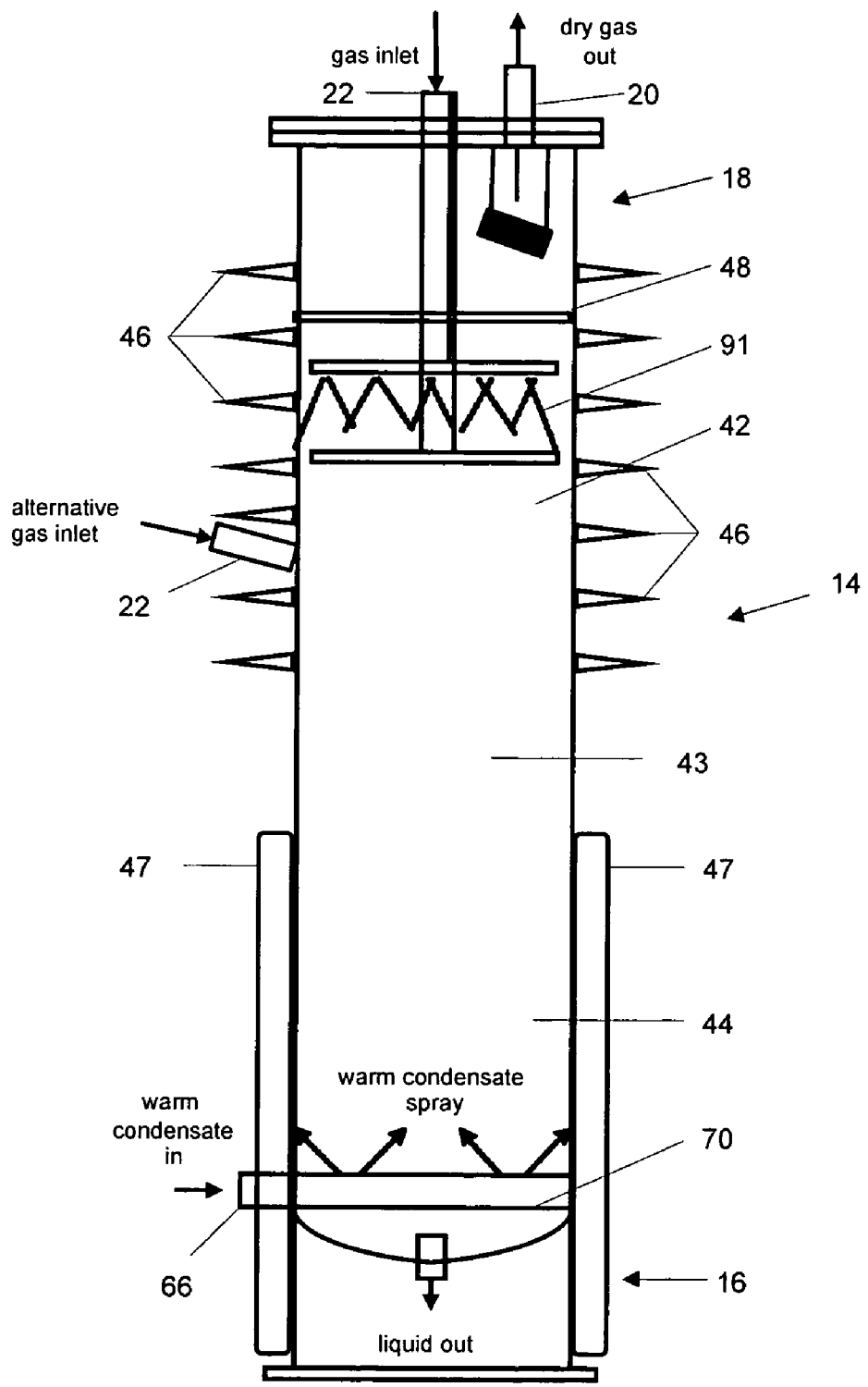
FIG. 5 illustrates one embodiment of the hydrate vessel suitable for an underwater environment where the water temperature is lower than the hydrate formation temperature.
Figure 6:
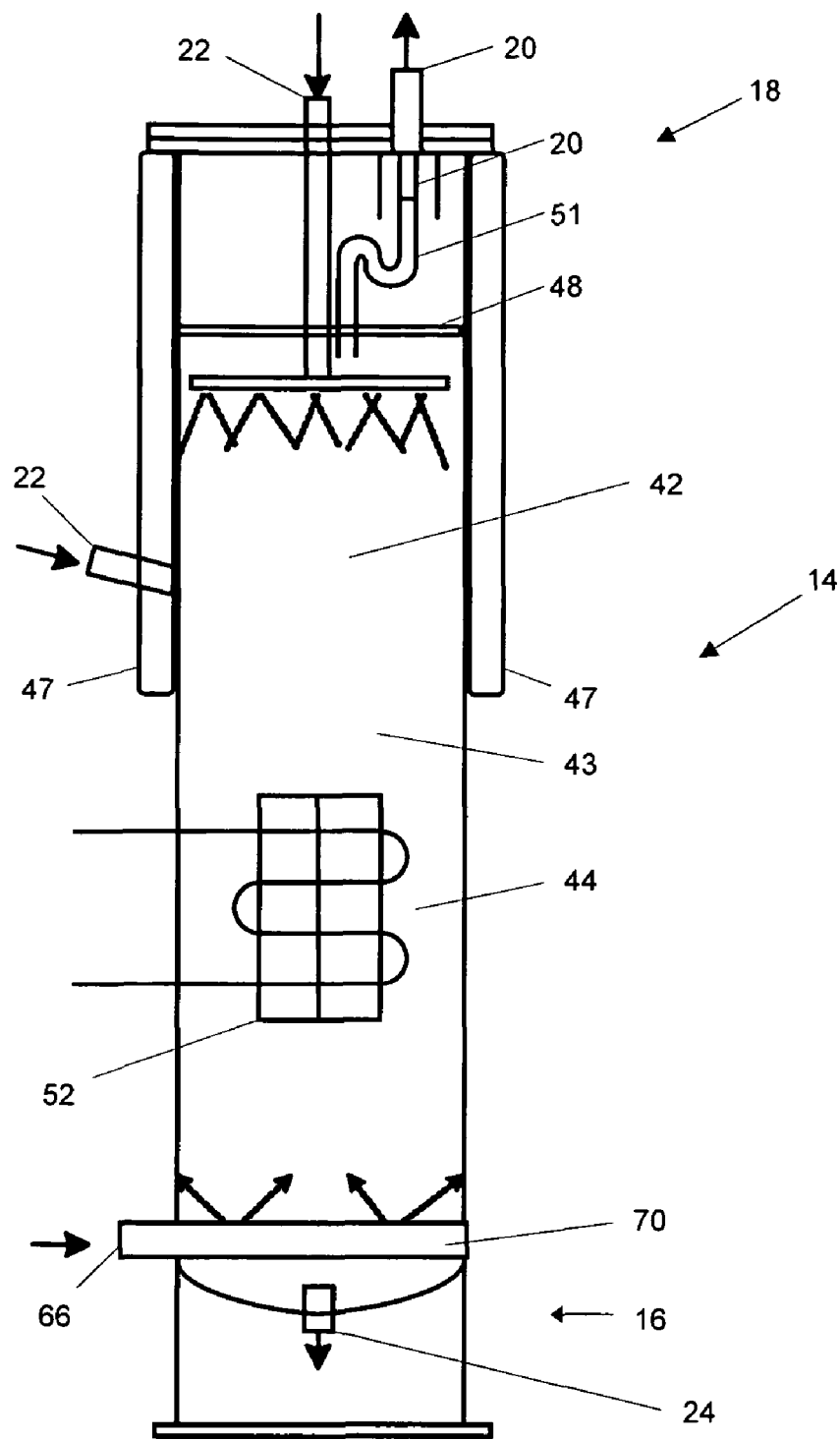
FIG. 6 illustrates an alternative embodiment of the hydrate vessel suitable for an underwater environment where the water temperature is higher than the hydrate dissolution temperature.

In the illustrated embodiment of FIG. 5, the hydrate vessel 14 is provided with one or more traps 48 arranged between the hydrate formation zone 42 and the dry gas outlet 20 to minimize the risk of carryover of the hydrates. The traps(s) 48 are provided with one or more apertures (not shown) to facilitate the drainage of any liquid that may accumulate or other condense above the trap(s) 48. Accordingly, the trap(s) 48 may take the form of a sieve, packing or a bubble tray. To further mitigate the risk of hydrate carry over, the embodiment of the hydrate vessel 14 illustrated in FIG. 6 is provided with a gas flow path deflection means 51 arranged to provide a tortuous pathway for the dry gas to flow from the hydrate dissolution zone 44 to the dry gas outlet 20.

The gas inlet 22 is adapted to encourage a drop in temperature of the natural gas feed stream. This may be achieved by causing a reduction in the pressure across the gas inlet 22. Accordingly, the gas inlet 22 may take the form of a nozzle, a venturi, a Joules-Thompson (J-T) valve or a turbo-expander. When the underwater temperature is below the hydrate formation temperature for a given pressure, the gas inlet 22 may equally take the form of a seawater heat-exchanger to effect the cooling as described in greater detail below with reference to FIG. 7.

Figure 2:
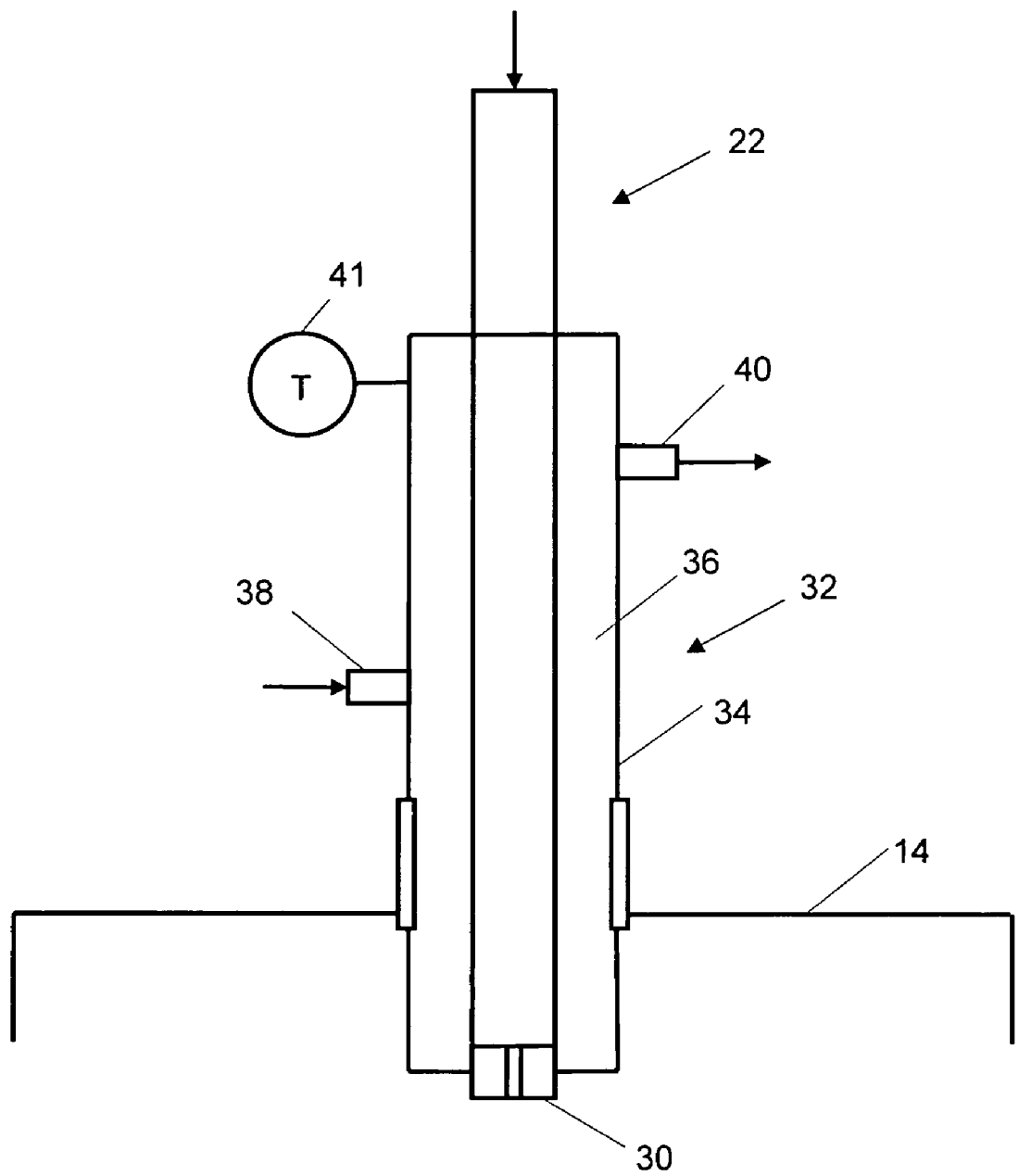
FIG. 2 is a schematic drawing of a nozzle unit assembly for use with the hydrate forming vessel of FIG. 1.

In the first embodiment illustrated in FIGS. 1 and 2, the gas inlet 22 takes the form of a nozzle 30 in co-operation with a nozzle heating unit 32 as best seen in FIG. 2. The pressure drop across the nozzle 30 produces an equivalent temperature drop creating ideal conditions for hydrate formation in the hydrate vessel 14. The nozzle heating unit 32 is used to maintain the temperature of the natural gas feed stream above the hydrate formation temperature prior to the introduction of the natural gas feed stream into to the hydrate vessel 14. The nozzle heating unit 32 is thus used to ensure that the nozzle 30 is not clogged by hydrates forming within the nozzle 30 in use. The nozzle heating unit 32 includes a jacket 34 defining a heating fluid channel 36 therewithin. The jacket 34 is further provided with a heating fluid inlet 38 and a heating fluid outlet 40 to moderate the flow of heated fluid into and out of the jacket 34. Any suitable heating fluid may be used with NGL or ethylene glycol being preferred. A thermocouple 41 or other suitable temperature measurement device is positioned in the heating fluid channel 36 to measure the temperature of the heating fluid in the channel 36 if desired. The nozzle 30 may be a plain-orifice nozzle or a nozzle adapted to cause atomization or misting of the natural gas feed stream.

In the embodiment of the hydrate vessel illustrated in FIG. 5, the temperature of the sea-bed environment is below the hydrate formation temperature for a given operating pressure of the hydrate vessel 14, and the hydrate formation zone 42 of the hydrate vessel 14 is arranged to exchange heat with the sea-bed environment so as to provide additional cooling to the hydrate formation zone 42 of the hydrate vessel 14. To further encourage this heat exchange, the hydrate vessel 14 is provided with a plurality of fins 46 which provide an increased surface area for heat exchange, the fins 46 being located external to the hydrate vessel 14 at a height adjacent to the hydrate formation zone 42. In this embodiment, the hydrate dissolution zone 44 of the hydrate vessel 14 is provided with a means for insulating against heat exchange with the sea-bed environment 47, in this example, lagging.

An alternative embodiment in which the temperature of the sea-bed environment is greater than the hydrate dissolution temperature for a given operating pressure of the hydrate vessel 14 is shown in FIG. 6. In this embodiment, the hydrate dissolution zone 44 of the hydrate vessel 14 is exposed to the sea-bed environment to allow heat exchange to melt the hydrates. This is achieved by circulating seawater through a first heat-exchanger 52 arranged either internal to the hydrate vessel 14 as illustrated in FIG. 6 or external to the hydrate vessel 14 (not shown), the first heat-exchanger being located at a height adjacent to the hydrate dissolution zone 44. In the illustrated embodiment of FIG. 6, the hydrate formation zone 42 of the hydrate vessel 14 is insulated against heat exchange with the sea-bed environment.

Prior to its introduction into the hydrate vessel 14, the natural gas feed stream may be subjected to one or more pre-cooling stages 50 between the wellhead 12 and the hydrate vessel 14. Pre-cooling need not be conducted on all of the natural gas feed stream. In the first embodiment illustrate in FIG. 1, pre-cooling is conducted on a bypass stream of natural gas, the flow of which is controlled by one or more control valves 54. Pre-cooling reduces the temperature of the natural gas feed stream to a value that is intermediate between wellhead conditions and the hydrate formation temperature for a given operating pressure of the hydrate vessel 14. In the first embodiment illustrated in FIG. 1, the pre-cooling stages 50 take the form of one or more second heat-exchanger(s) 82 through which, for example, seawater is circulated to effect the cooling. Alternatively or additionally pre-cooling may be achieved by passing the natural gas through pipework that is directly exposed to a low temperature sea-bed environment as described below in relation to a fourth embodiment of the present invention.

The process and apparatus of the present invention may be used for wellhead pressures in the range of 800 to 6000 psi or 2000-4000 psi and/or wellhead temperatures in the range of 25 to 110° C. or 25 to 45° C. Pre-cooling typically reduces the temperature of the natural gas feed stream to around 2-5° C. or 2.5 to 3.5° C. above the hydrate formation temperature for a given pressure.

To remove free water and NGL from the wellhead gas, the natural gas feed stream is passed through one or more gas/liquid separator(s) 60 in parallel or in series. Any suitable gas/liquid separator may be used such as a vertical scrubber, a flash tank, a slug catcher, a cyclone, or a knockout pot with solids such as sand also being removed if required. When a vertical scrubber is used, the bottom of the scrubber may be connected to a phase separator (not shown) to separate gas, water, oil and solids. The composition of the NGL that is separated from the gas using the gas/liquid separator(s) 60 depends on a number of relevant factors including, but not limited to, the composition of the wellhead gas, the temperature and pressure of the wellhead gas and the degree of cooling that has occurred in the pre-cooling stage(s) 50. The NGL and free water that is separated from the gas in the gas/liquid separator(s) 60 may be discarded or otherwise disposed of using the disposal unit described in greater detail below with reference to FIG. 8 or re-injected into the pipeline delivering the dry outlet gas to shore. The NGL may equally be recycled for use in the process as a warm liquid in the manner described below.

In the embodiment illustrated in FIG. 1, the hydrates are dissolved in the hydrate dissolution zone 44 by introducing a warm liquid to the hydrate vessel through a warm liquid inlet 66 positioned at a height intermediate between the gas inlet 22 and the liquid outlet 24. The warm liquid can be any compatible stream of liquid provided only that the temperature of the warm liquid is above the hydrate dissolution temperature for the given operating pressure of the hydrate vessel 14. It is desirable that the warm liquid be heated to a temperature that is only a few degrees higher than the hydrate dissolution temperature. If the warm liquid temperature is significantly higher than the hydrate dissolution temperature, the efficiency of operation of the hydrate vessel 14 will be lower due to a greater probability of heat transfer between the hydrate dissolution zone 44 and the hydrate formation zone 42. The warm liquid may be one or more of water, NGL, salt water, or a combination thereof. It is preferable that the warm liquid does not itself form solids within the vessel. Thus water should only be used as the warm liquid when the hydrate formation temperature is greater than zero degrees Celsius.

In the first embodiment of the present invention, the warm liquid is applied to the inner walls of the hydrate vessel 14 by spraying using one or more sprayer(s) 70. This is done to facilitate removal of hydrates which may have formed on the inner walls of the hydrate vessel 14 and to maximize heat transfer. The warm liquid may equally be atomized using any suitable gas, for example a portion of the pre-cooled natural gas feed stream in the form of a bypass stream 72 shown in FIG. 4. The sprayer 70 may be provided with insulation or a heating jacket (not shown) if desired. In the second embodiment of the present invention illustrated in FIG. 3, the warm liquid is applied to the inner walls of the hydrate vessel 14 by arranging the warm liquid inlet 66 to be tangential to the hydrate vessel 14. This has the flow on effect of creating a vortex within the hydrate vessel 14. The vortex created assists in washing any undissolved hydrate towards the lowermost portion 16 of the hydrate vessel 14.

A water-containing liquid including any undissolved hydrates is removed from the lowermost end 16 of the hydrate vessel 14 via liquid outlet 24. When a warm liquid is used to dissolve the hydrates in the hydrate vessel 14, the water-containing liquid stream will further include this liquid which will now be at a lower temperature than the temperature at which it was introduced. For example, if the warm liquid is an NGL, the water-containing liquid removed via liquid outlet 24 will contain water and the NGL. The water-containing liquid from the hydrate vessel 14 is directed to one or more phase separator(s) 80 which advantageously rely on gravity separation to allow separate recovery of water, warm liquid and gas. For example, a baffled gravity separation unit may be used as the phase separator 80. In an alternative embodiment (not shown), the phase separator 80 is located at and defines the liquid outlet 24 of the hydrate vessel 14.

To dissolve any hydrate that remains undissolved, the water-containing liquid may be heated external to the hydrate vessel 14. In the first embodiment this is done by passing the water-containing liquid through one or more third heat-exchanger(s) 84 external to the phase separator(s) 80 or by applying direct or indirect heating to the phase separator(s) 80. The natural gas feed stream at wellhead temperature or the free water separated from the wellhead gas using the gas/liquid separators 60 may be used as a source of heat to the third heat-exchanger(s) 84.

The separated water from the phase separator(s) 80 may be disposed of using the disposal unit described below or re-injected in the reservoir. The separated NGL from the phase separator(s) 80 may be recycled as a warm liquid after being re-heated to a temperature above the hydrate dissolution temperature for the given operating pressure of the hydrate vessel 14. In the illustrated embodiment of FIG. 1, a portion of the separated NGL from the phase separator(s) 80 is re-heated through heat exchange with wellhead gas using the second heat-exchanger(s) 82.

Figure 3:
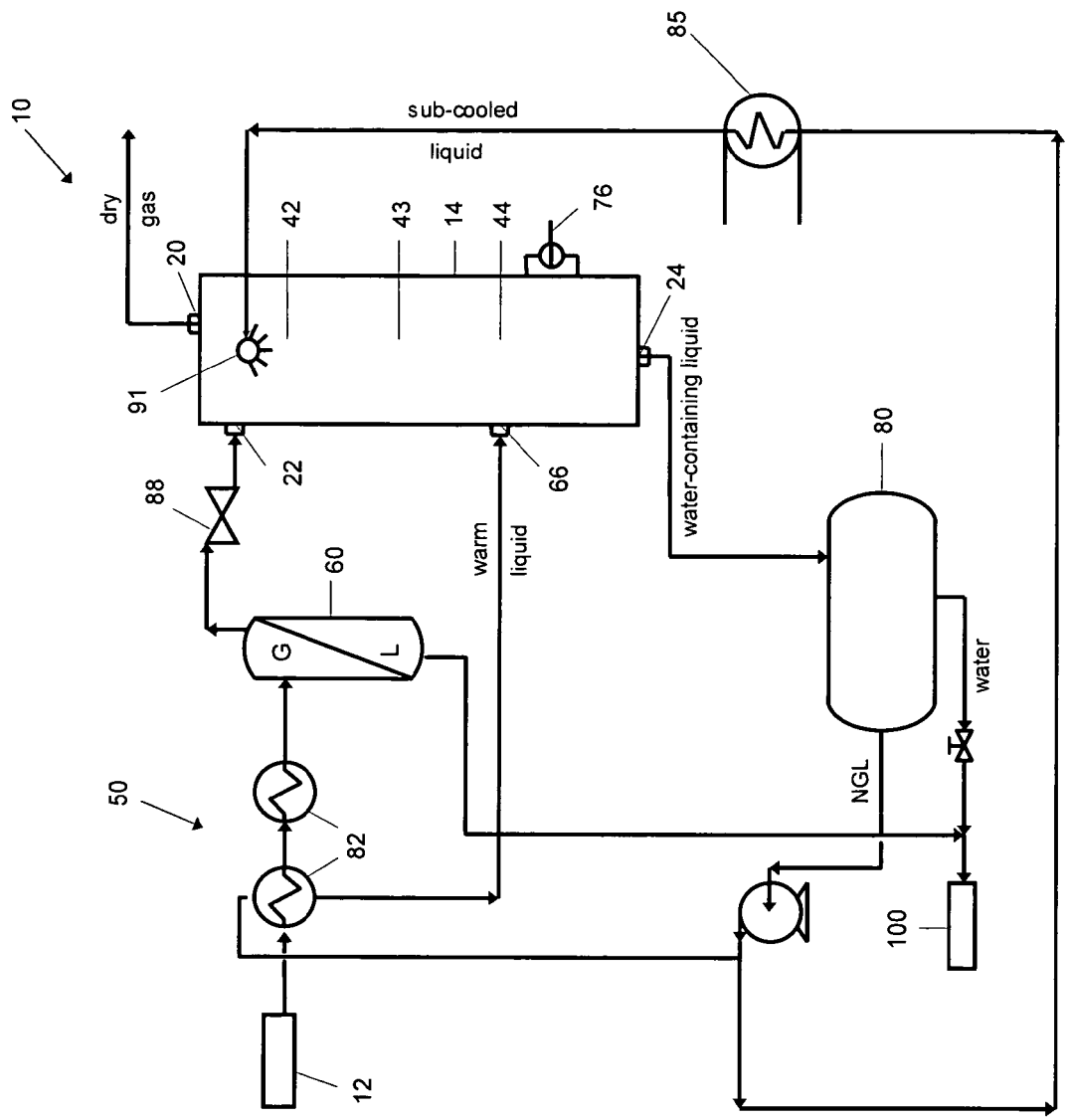
FIG. 3 illustrates a process flow diagram of a second embodiment of the present invention.

If additional cooling of the natural gas feed stream is desired, the process may further comprise the step of introducing one or more stream(s) of a sub-cooled liquid into the hydrate formation zone 42 of the hydrate vessel 14 using one or more sub-cooled liquid sprays 91, the sub-cooled liquid having a temperature below the hydrate formation temperature for a given operating pressure of the hydrate formation vessel. It is desirable to introduce the sub-cooled liquid by spraying the sub-cooled liquid and/or atomizing the sub-cooled liquid with a gas to maximize heat transfer and to serve as possible nucleation sites for hydrate formation. Suitable sub-cooled liquids include water, NGL or salt water. One suitable source of the sub-cooled liquid is the NGL separated in the phase separator(s) 80 which may be cooled using a third heat-exchange 85 as illustrated in FIG. 3 through heat-exchanger with circulated seawater.

Figure 8:
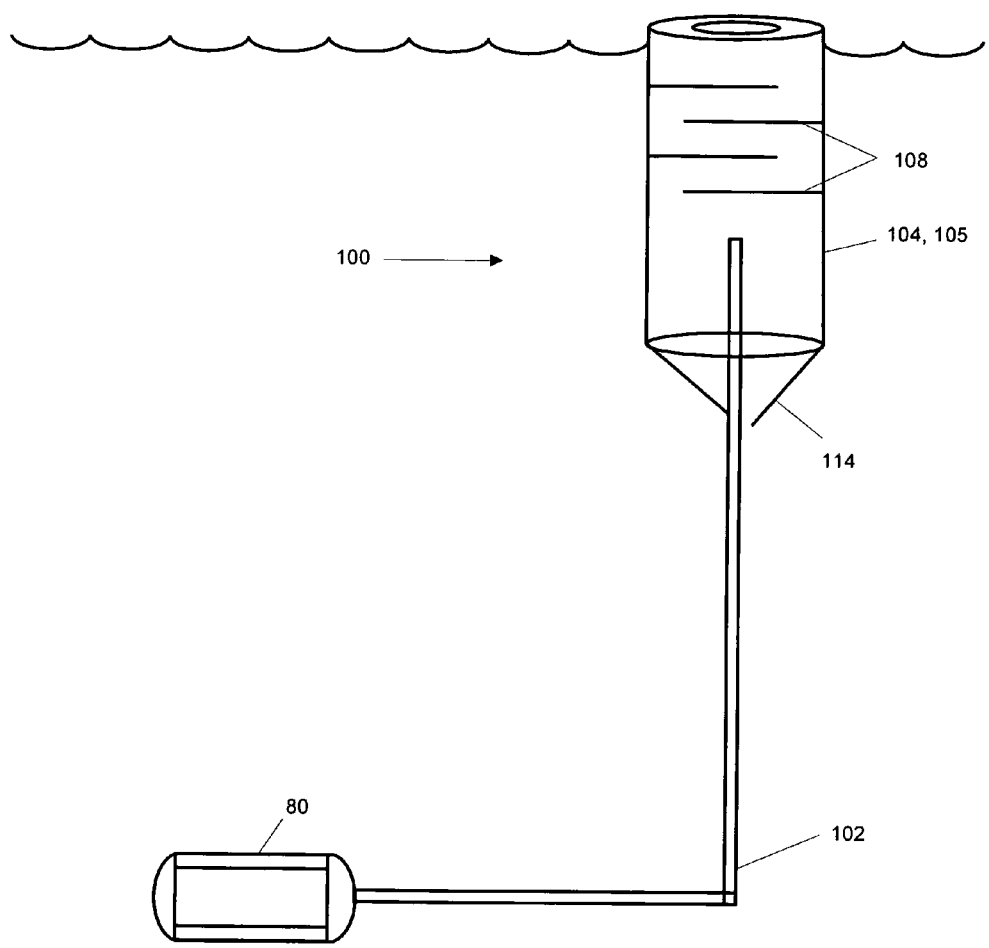

The phase separator(s) 80 may be connected to a water disposal unit 100 such as a simple incinerator. An alternative water disposal unit 100 is illustrated in FIG. 8 and described in detail below.

Any liberated gas that is present in the phase separator(s) 80 may be compressed and returned to the hydrate vessel 14 to balance the pressure between the hydrate vessel 14 and the phase separator(s) 80 or recycled to the pre-cooled natural gas feed stream entering the hydrate vessel 14 via gas inlet 20 or compressed and used to atomize the warm liquid that is sprayed into the hydrate vessel 14. Alternatively or additionally, the liberated gas from the phase separator(s) 80 may simply be vented or flared as it is anticipated that the quantity of gas liberated from the phase separator(s) 80 will be very small.

At start-up, the apparatus 10 is purged with natural gas to expel any air present in the hydrate vessel 14 and associated equipment and pipework. The hydrate vessel 14 is pre-cooled during this start-up phase. The low temperature of the sub-sea environment may be used to advantage in maintaining the temperature of the hydrate vessel 14 at a minimum when not in use. To commence operation, the pre-cooled natural gas feed stream is fed to the hydrate vessel 14 until the pressure of the hydrate vessel 14 reaches a predetermined level of operating pressure. When this has been achieved, dry gas is vented from the hydrate vessel 14 through the dry gas stream outlet 20. Thereafter, the flow rate of the pre-cooled natural gas feed stream is adjusted to match the venting rate of the dry gas outlet stream for continuous operation. At the same time, the water-containing liquid is drained from the lowermost portion 16 of the hydrate vessel 14 at a rate which is matched to the flow rate of the warm liquid being introduced to the hydrate vessel 14. The hydrate vessel 14 is provided with a level indicator 76 to monitor the level of the water-containing liquid.

Figure 4:
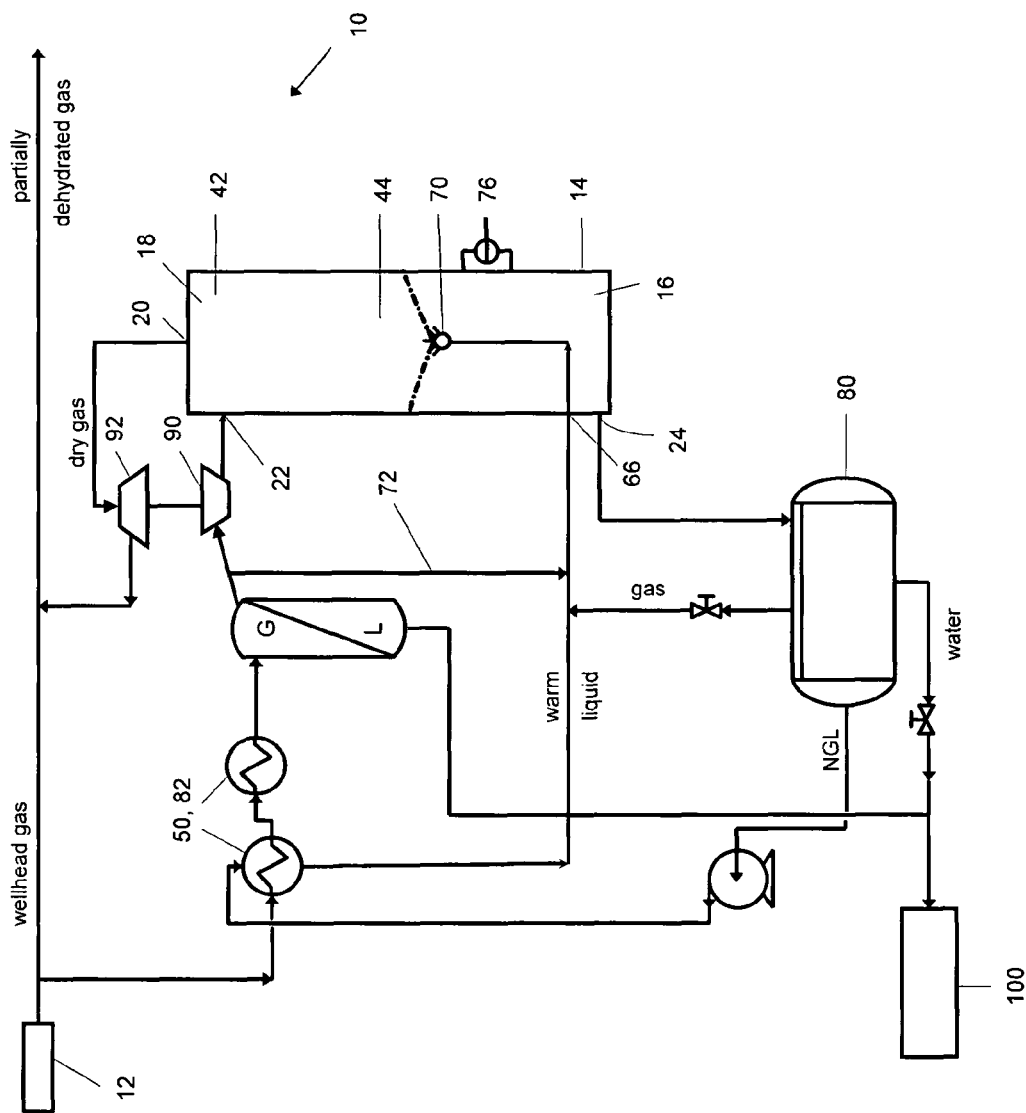
FIG. 4 illustrates a process flow diagram of a third embodiment of the present invention.

A second embodiment of the present invention is illustrated in FIG. 3 for which like reference numerals refer to like parts and streams. A third embodiment of the present invention is illustrated in FIG. 4 for which like reference numerals refer to like parts and streams. In the second embodiment, the pre-cooled natural gas feed stream is fed into the hydrate vessel 14 through an expansion device in the form of a J-T valve 88. In the third embodiment the expansion device takes the form of a turboexpander 90. For high feed gas pressure, use of a turboexpander 90 is preferred. The expansion through a J-T valve is isenthalpic (constant enthalpy, no work or heat transfer) while the turboexpander takes work out of the system making it isentropic. The mechanical work created by a turboexpander 90 may be used for example to provide the energy to drive a compressor 92 which may be used, for example, for adding the liberated gas from the phase separator(s) 80 back to the hydrate vessel 14. The J-T valve 88 and the turboexpander 90 may be used alone or in combination.

Upon expansion of the natural gas feed stream into the hydrate vessel 14 using either the J-T valve 88 or the turboexpander 90, the conditions of pressure and temperature within the hydrate vessel 14 are conducive to the formation of hydrates. For example, for a natural gas feed stream from the well head at around 75 bar pressure at 25° C. being fed to the hydrate vessel 14 operating at around 65 to 70 bar, the drop in pressure across a J-T valve will be in the order of 10 bar. This leads to a drop in temperature sufficient to cause hydrate formation. In the embodiment illustrated in FIG. 3, the J-T valve 88 is located at and defines the gas inlet 22 to the hydrate vessel 14. In the embodiment illustrated in FIG. 3, a portion of the natural gas feed stream at wellhead temperature is circulated either internally or externally of the hydrate dissolution zone 44 of the hydrate vessel 14 as a source of heat to dissolve the hydrates.

Figure 7:
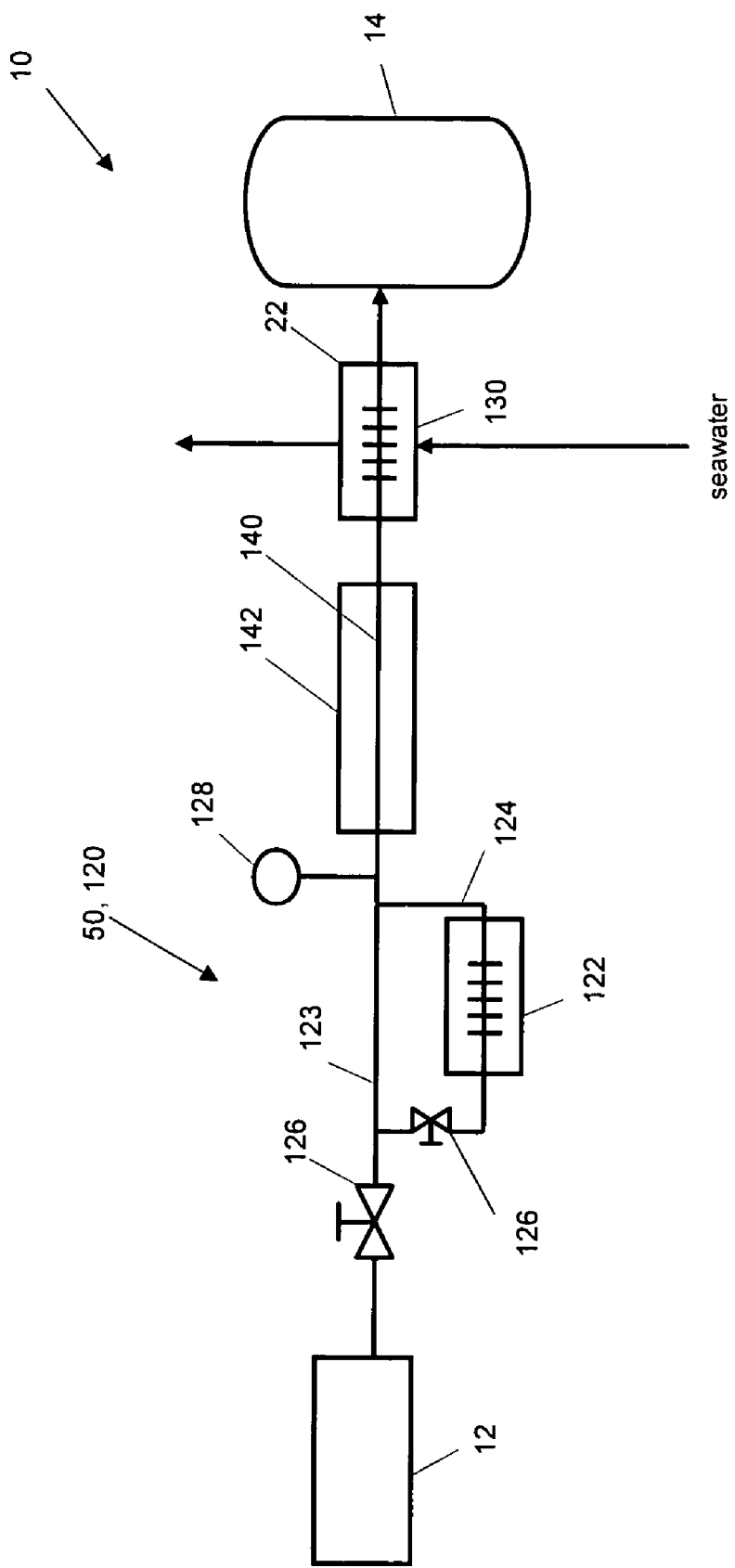
FIG. 7 illustrates a process flow diagram of a fourth embodiment of the present invention; and, FIG. 8 illustrates one embodiment of a water disposal unit.

A fourth embodiment of the present invention is illustrated in FIG. 7 for which like reference numerals refer to like parts and streams. In this embodiment, the pre-cooling stage 50 is provided in the form of a means 120 for transferring natural gas from the wellhead 10 to the hydrate vessel 14, in this example an arrangement of pipes. It will be readily appreciated that the degree of pre-cooling of the natural gas feed stream that occurs as it flows through the arrangement of pipes 120 depends in part on the length, number, shape and configuration of the pipes 120, the temperature differential between that of the natural gas feed stream and the underwater environment, and the thermal conductivity of the material of construction of the pipes. To increase the efficiency and kinetics of pre-cooling, the arrangement of pipes 120 may be provided with a means 122 to increase surface area, in the form of a plurality of fins or baffles arranged along at least a portion of the length of the pipes 120.

With reference to FIG. 7, the arrangement of pipes 120 is split into a direct flow loop 123 and one or more cooling loop(s) 124 through which the flow of natural gas may be diverted using one or more control valves 126 actuated in response to the temperature measured using a temperature sensor 128. The cooling loop 124 is arranged to facilitate heat exchange with the underwater environment to a greater degree than a direct flow loop 123. The temperature sensor 128 is located downstream of the cooling loop(s) 124. The control valve 126 is actuated when additional pre-cooling of the natural gas is required, causing a portion of the natural gas to be diverted from the direct flow loop 123 through the cooling loop(s) 124. It is considered a matter of routine for a person skilled in the art to design the cooling loop(s) 124 to effect the desired degree of pre-cooling of the natural gas feed stream, provided only that the temperature of the natural gas feed stream does not fall below the hydrate formation temperature for a given pressure and composition of the natural gas.

The embodiment illustrated in FIG. 7 includes one final pre-cooling stage 50 in the form of one or more fifth heat-exchanger(s) 130 located upstream of the gas inlet 22 of the hydrate vessel 14. The fifth heat-exchanger 130 is used to cool the natural gas feed stream to a temperature just above the hydrate formation temperature adjacent to the gas inlet 22. When the underwater temperature is less than the hydrate formation temperature, seawater may be circulated through the fifth heat-exchanger(s) 130 to effect the cooling. Alternatively or additionally, the fifth heat-exchanger 130 may be a length 132 of pipe provided with means to increase surface area 122 in the form of a plurality of fins or baffles arranged along its length.

Depending on the length of the arrangement of pipes 120, the difference in temperature between the natural gas at the wellhead and the hydrate formation temperature, and the degree of pre-cooling required, it may be necessary to provide a means 142 for insulating a portion of the pipe 140 to reduce the amount of pre-cooling that is allowed to occur.

An embodiment of a water disposal unit 100 for use with the process and apparatus of the present invention is now described with reference to FIG. 8. The water disposal unit is used to dispose of separated water that exits the phase separator(s) 80. The separated water from the phase separator 80 will be saturated with gas at the operating pressure of the phase separator 80. The separated water may also contain hydrocarbons in the form of entrained oil in emulsion with the separated water. The water disposal unit 100 acts as a gravity separator and comprises a conduit 102 extending from the phase separator 80 at the sea-bed and terminating in a containment means 104. The buoyancy of the containment means 104 may be adjusted such that it floats on the surface of the water or such that it is positioned at an intermediate distance below the waterline but above the sea-bed. The containment means 104 may be anchored to the sea-bed to secure its position.

The separated water is expected to be less dense than seawater which will cause it to rise through the conduit 102. As the separated water rises, entrained hydrocarbons separate from the water in the conduit 102. The hydrocarbons will continue to rise towards the waterline to float above the water in the conduit 102. As a result, the hydrocarbons accumulate within the containment means 104 for disposal. In one embodiment, the containment means 104 is located at the waterline and exposed to direct sunlight to encourage either evaporation or decomposition due to exposure to the sun. To further encourage evaporation through exposure to direct sunlight, the containment means 104 may be dark in colour.

In one embodiment, the disposal unit 100 is provided with a sleeve 105 within which the conduit 102 terminates. The sleeve 105 is provided with a plurality of baffles 108 arranged to provide a convoluted flow path for the separated water to allow additional time for separation of the hydrocarbons from the separated water. Without wishing to be bound by theory, it is understood that the convoluted flow path increases the opportunity for oil particles to collide and agglomerate, thus improving separation.

When the present invention is used for dehydrating natural gas from sub-sea wells, it is anticipated that the containment means 104 will be arranged to float at the waterline. Wave motion in the ocean may result in repeated increases and decreases in the static head in the column of water contained within the sleeve 105 and/or the conduit 102 which could result in re-mixing of the water and separated hydrocarbons in the column of water within conduit 102. To overcome this potential problem, the water disposal unit 100 is further provided with a pressure equalization means 114, in this example one or more gates arranged to shut in response to an increase in the static head of the water column to minimize turbulence and thus mixing.

Now that various embodiments of the present invention have been described in detail, the present invention has a number of advantages over the prior art, including the following:

a) the underwater or sub-sea environment is being used as a free, renewable and natural heat exchange medium;

b) sub-sea dehydration of the gas reduces the likelihood of corrosion in the pipelines used to transport the gas from a sub-sea wellhead to land or to an offshore platform or FPSO vessel which can lead to significant savings in pipeline material costs;

c) the positioning of the dehydration apparatus underwater provides an increased level of security as access to the apparatus is more difficult than for dehydration equipment that is located on land; and, d) treating the natural gas underwater may eliminate the need to use an offshore platform which leads to significant savings in capital expenditure and also reduces the impact on the environment.

Now that several embodiments of the invention have been described in detail, it will be apparent to persons skilled in the chemical engineering arts that numerous variations and modifications can be made without departing from the basic inventive concepts. For example, it is possible to operate the process and apparatus on a bypass stream such that only a portion of the wellhead gas is dehydrated sub-sea. The dry gas may then be returned to an existing pipeline resulting in at least a partial dehydration of the natural gas transported through the pipeline to land or to an offshore platform or FPSO. It is equally possible to run a plurality of the sub-sea apparatuses in parallel to provide backup capacity to allow scheduled or unscheduled maintenance to be carried out without the need to shut down the dehydration operation. All such modifications and variations are considered to be within the scope of the present invention, the nature of which is to be determined from the foregoing description and the appended claims.

It will be clearly understood that, although a number of prior art publications are referred to herein, this reference does not constitute an admission that any of these documents forms part of the common general knowledge in the art, in Australia or in any other country. In the description of the invention and the claims which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A process for removing water from a natural gas in an underwater environment which process comprises dehydrating a natural gas feed stream in an apparatus arranged to exchange heat with the underwater environment, wherein the step of dehydrating the natural gas feed stream includes the step of forming hydrates in a hydrate forming zone of a hydrate vessel, the process further comprising the step of dissolving at least a portion of the hydrates in a hydrate dissolution zone of the hydrate vessel to form dry gas and a water-containing liquid, and removing from the hydrate vessel a dry gas outlet stream and a water-containing liquid stream, wherein the step of dissolving at least a portion of the hydrates comprises the step of adding to the hydrates a warm liquid having a temperature above the hydrate dissolution temperature for a given operating pressure of the hydrate vessel, and wherein the step of adding a warm liquid to the hydrate vessel comprises the step of spraying or atomizing the warm liquid into the hydrate dissolution zone of the hydrate vessel, the process further comprising the step of separating the water and the warm liquid from the water-containing liquid removed from the hydrate vessel, the process further comprising the step of re-heating the warm liquid for recycle to the step of dissolving the hydrates in the hydrate dissolution zone of the hydrate vessel, wherein the warm liquid is reheated through heat exchange with the natural gas feed stream from the wellhead as a pre-cooling stage for the natural gas feed stream.

2. The process according to 1 wherein the step of forming hydrates in the hydrate zone comprises the step of introducing the natural gas feed stream into the hydrate vessel through an expansion device.

3. The process according to claim 2 wherein the expansion device is located at and defines a gas inlet to the hydrate vessel.

4. The process of claim 1 wherein the temperature of the underwater environment is less than the hydrate formation temperature for a given operating pressure of the hydrate vessel and the step of forming hydrates is achieved in part through heat exchange of the natural gas feed stream with the underwater environment.

5. The process of claim 1 wherein the step of forming hydrates is achieved in part through heat exchange of the natural gas feed stream with the underwater environment in the hydrate formation zone of the hydrate vessel.

6. The process of claim 1 further comprising the step of pre-cooling the natural gas feed stream to a temperature that is intermediate between wellhead temperature and hydrate forming temperature through heat exchange with the underwater environment prior to the step of dehydrating the natural gas feed stream.

7. The process according to claim 1 wherein the warm liquid is at least one of natural gas liquids, water and seawater.

8. The process according to claim 1 further comprising the step of separating the water and the warm liquid from the water-containing liquid removed from the hydrate vessel.

9. The process according to claim 8 further comprising the step of re-heating the warm liquid for recycle to the step of dissolving the hydrates in the hydrate dissolution zone of the hydrate vessel.

10. The process according to claim 9 wherein the warm liquid is reheated through heat exchange with the natural gas feed stream from the wellhead as a pre-cooling stage for the natural gas feed stream.

11. The process according to claim 1 further comprising the step of passing the natural gas feed stream through a gas/liquid separator prior to the step of dehydrating the natural gas feed stream to remove free water and natural gas liquids from the natural gas feed stream.

12. The process of claim 1, wherein natural gas is delivered from a sub-sea well or sub-sea manifold to land.

* * * * *